US009515718B2

United States Patent
Sahara (10) Patent No.: US 9,515,718 B2
(45) Date of Patent: Dec. 6, 2016

(54) METHOD AND APPARATUS FOR MIMO CHANNEL EQUALIZATION USING ORTHOGONAL SIGNALS

(71) Applicant: KYOCERA CORPORATION, Kyoto (JP)

(72) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/780,362

(22) PCT Filed: Mar. 26, 2014

(86) PCT No.: PCT/JP2014/001748
§ 371 (c)(1),
(2) Date: Sep. 25, 2015

(87) PCT Pub. No.: WO2014/156147
PCT Pub. Date: Oct. 2, 2014

(65) Prior Publication Data
US 2016/0050056 A1    Feb. 18, 2016

(30) Foreign Application Priority Data

Mar. 26, 2013   (JP) ................. 2013-064711

(51) Int. Cl.
*H04B 7/08*    (2006.01)
*H04L 25/02*   (2006.01)
(Continued)

(52) U.S. Cl.
CPC .......... *H04B 7/0842* (2013.01); *H04B 7/0413* (2013.01); *H04L 5/0048* (2013.01);
(Continued)

(58) Field of Classification Search
CPC   H04B 7/0669; H04B 7/0697; H04B 7/0413; H04B 7/04; H04B 7/0452; H04B 7/0842; H04B 17/391; H04B 17/20; H04L 25/0202; H04L 25/0232; H04L 25/03891; H04L 25/02; H04L 27/2647; H04L 5/0092; H04L 5/0048; H04L 5/0023; H04L 27/261; H04J 13/10; H04J 13/12
See application file for complete search history.

(56) References Cited

U.S. PATENT DOCUMENTS 6,496,144 B2 * 12/2002 Tanaka .................... G01S 3/14
                                                    342/378
8,804,647 B2 *  8/2014 Ko ....................... H04J 13/0074
                                                    370/312
(Continued)

FOREIGN PATENT DOCUMENTS

JP    2005-124125 A    5/2005
JP    2011-071918 A    4/2011
(Continued)

OTHER PUBLICATIONS

Lim et al., "Recent trend of multiuser MIMO in LTE-advanced," in Communications Magazine, IEEE , vol. 51, No. 3, pp. 127-135, Mar. 14, 2013.*
(Continued)

*Primary Examiner* — Michelle M Koeth
(74) *Attorney, Agent, or Firm* — Studebaker & Brackett PC (57) ABSTRACT

A receiving apparatus 10 includes an adaptive array antenna 11, a reference signal synthesizer 15 that calculates a synthesized reference signal by multiplying a reference signal portion of each layer by an orthogonal signal to synthesize proximity reference signal portions of different resource elements and multiplies a known reference signal by the orthogonal signal, a weight calculator 16 that calculates an adaptive array weight from the synthesized reference signal and a known reference signal multiplied by the orthogonal signal, a weight synthesizer 17 that calculates a synthesized reception signal by multiplying the reference signal portion by the adaptive array weight to perform an antenna synthesis, a channel estimator 18 that estimates a propagation path from the synthesized reception signal and the known reference signal multiplied by the orthogonal signal, and a channel equalizer 19 that implements a channel equalization from the synthesized reception signal and the propagation path.

4 Claims, 5 Drawing Sheets

(51) Int. Cl.
*H04L 5/00* (2006.01)
*H04L 27/26* (2006.01)
*H04B 7/04* (2006.01)
*H04B 7/06* (2006.01)
*H04B 17/20* (2015.01)
*H04B 17/391* (2015.01)

(52) U.S. Cl.
CPC ....... *H04L25/0202* (2013.01); *H04L 25/0232* (2013.01); *H04L 27/261* (2013.01); *H04B 7/0669* (2013.01); *H04B 17/20* (2015.01); *H04B 17/391* (2015.01); *H04L 5/0023* (2013.01); *H04L 5/0092* (2013.01)

(56) References Cited

U.S. PATENT DOCUMENTS

| 2011/0075743 | A1* | 3/2011 | Koike | H04L 25/0204 375/259 |
|---|---|---|---|---|
| 2012/0177140 | A1 | 7/2012 | Sahara | |
| 2012/0183090 | A1* | 7/2012 | Sahara | H04B 7/0413 375/267 |
| 2013/0308716 | A1* | 11/2013 | Toh | H04B 7/0456 375/267 |

FOREIGN PATENT DOCUMENTS

| JP | 2011-077942 A | | 4/2011 | |
| JP | 2011-071918 A | * | 7/2011 | ............... H04B 7/02 |
| JP | 2012-065331 A | | 3/2012 | |
| JP | 2012-147174 A | | 8/2012 | |

OTHER PUBLICATIONS

Haider, "How Stuff Works—802.11n and Spatial Multiplexing," WiFi Jedi.com, Feb. 2009, (available at "http://wifijedi.com/2009/02/01/how-stuff-works-spatial-multiplexing/", last accessed Jan. 25, 2016).*

3GPP TS 36.211 V10.4.0 "Physical Channels and Modulation", 2012.

International Search Report and Written Opinion from International Searching Authority from PCT/JP2014/001748 dated Apr. 28, 2014.

* cited by examiner

| m' | $w_{p,m'}$ | |
|---|---|---|
| | Antenna port: 7, 8, 11, 13 | Antenna port: 9, 10, 12, 14 |
| 0 | 1 | 1 |
| 1 | 1 | $\exp(j*2*\pi/3)$ |
| 2 | 1 | $\exp(j*4*\pi/3)$ |

FIG. 4A

Mapping of reference signals for antenna ports 7, 8, 11 and 13

FIG. 4B

Mapping of reference signals for antenna ports 9, 10, 12 and 14

FIG. 5

| Antenna port p | [ $\bar{w}_p(0)$ $\bar{w}_p(1)$ $\bar{w}_p(2)$ $\bar{w}_p(3)$ ] |
|---|---|
| 7 | [ +1 +1 +1 +1 ] |
| 8 | [ +1 -1 +1 -1 ] |
| 9 | [ +1 +1 +1 +1 ] |
| 10 | [ +1 -1 +1 -1 ] |
| 11 | [ +1 +1 -1 -1 ] |
| 12 | [ -1 -1 +1 +1 ] |
| 13 | [ +1 -1 -1 +1 ] |
| 14 | [ -1 +1 +1 -1 ] |

METHOD AND APPARATUS FOR MIMO CHANNEL EQUALIZATION USING ORTHOGONAL SIGNALS

CROSS REFERENCE TO RELATED APPLICATION

This application claims priority of Japanese Patent Application No. 2013-064711 (filed on Mar. 26, 2013), the entire contents of which are incorporated herein by reference.

TECHNICAL FIELD

This disclosure relates to a receiving apparatus and a receiving method used in a wireless communication system that allows for MIMO (Multiple Input Multiple Output) communication.

BACKGROUND

In the LTE (Long Term Evolution) Release 10 standardized by 3GPP (Third Generation Partnership Project), 8×8 MIMO is defined and 8-layer spatial multiplexing is supported. Thus the base station can transmit data of spatially multiplexing of up to 8 layers (see NPL 1).

Figure 4A:
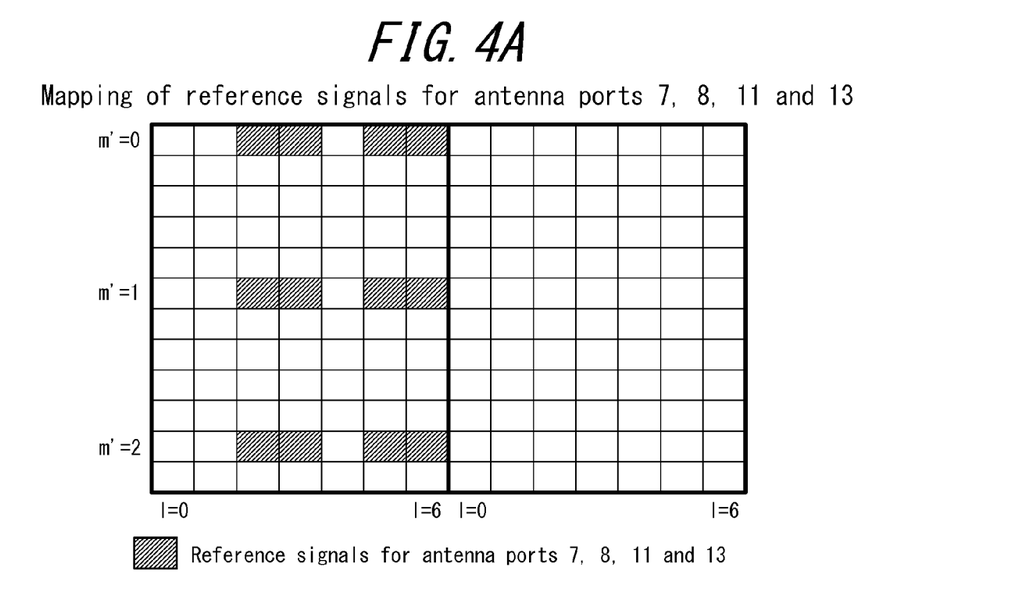
FIG. 4A is a diagram illustrating an example of mapping of reference signals with respect to each antenna port of LTE.
Figure 4B:
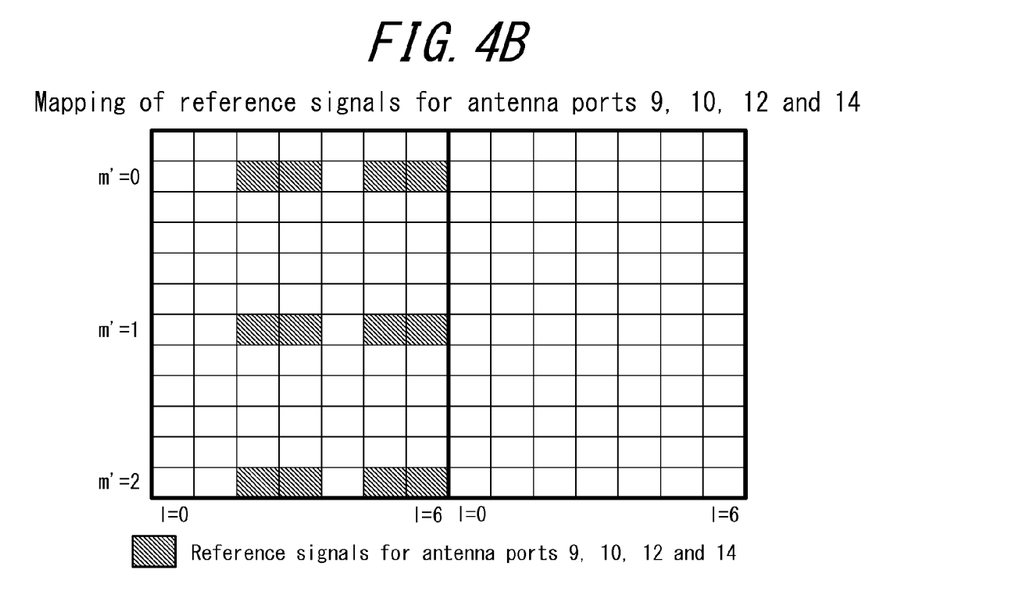
FIG. 4B is a diagram illustrating an example of mapping of reference signals with respect to each antenna port of LTE.

FIGS. 4A and 4B illustrate an example of a reference signal mapping specific to a user terminal (UE-specific reference signals) defined by the LTE Release 10. In FIGS. 4A and 4B, the horizontal axis is time and the vertical axis is frequency. In the horizontal axis, one division represents one symbol and in the vertical axis, one division represents one subcarrier. In the example illustrated in FIGS. 4A and 4B, 8 antenna ports of the base station are divided into two groups where group 1 includes antenna ports 7, 8, 11 and 13 and group 2 includes antenna ports 9, 10, 12 and 14.

FIG. 4A illustrates a mapping of reference signals of group 1 (antenna ports 7, 8, 11 and 13) and FIG. 4B illustrates a mapping of reference signals of group 2 (antenna ports 9, 10, 12 and 14). As illustrated in FIGS. 4A and 4B, resource elements to which the reference signals are assigned are different in group 1 and group 2. Here, the resource element is an area of one square in FIGS. 4A and 4B, that is, an area having time of one symbol and frequency of one subcarrier. In FIGS. 4A and 4B, although the positions of symbols to which reference signals are assigned are the same, the positions of subcarriers are different.

Figure 5:
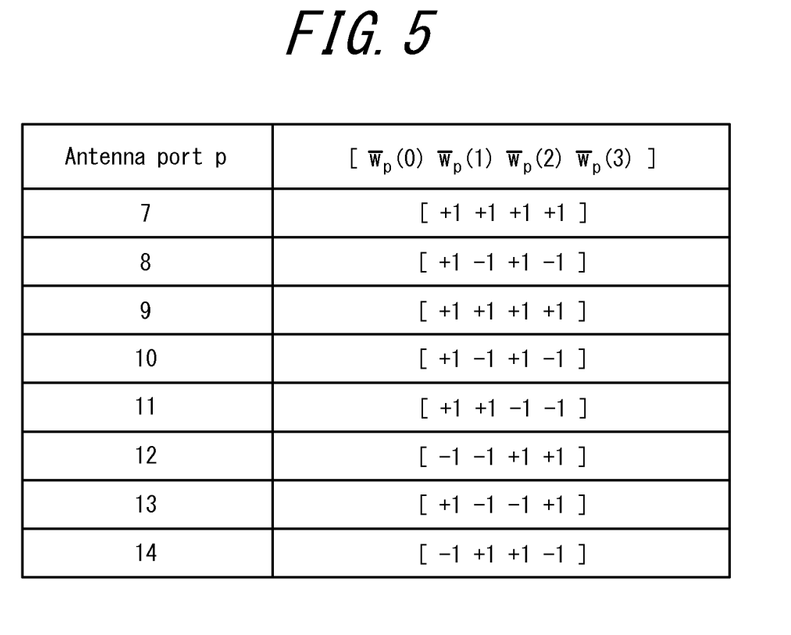
FIG. 5 is a diagram illustrating a sequence to a normal CP (Cyclic Preface) of LTE.

As in the case of antenna ports 7, 8, 11 and 13 of group 1, the reference signals mapped to the same resource element are multiplied by the sequence to the normal CP (Cyclic Prefix) of LTE as illustrated in FIG. 5, thus the signals are orthogonal to each other. Therefore, a spatially multiplexed signal can be extracted by directing a null to the other layers in the same group. In the same manner, for the antenna ports 9, 10, 12 and 14 of group 2, a spatially multiplexed signal can be extracted by directing a null to the other layers in the same group.

CITATION LIST

Non-Patent Literature

NPL 1: 3GPP TS 36.211 V10.4.0 "Physical Channels and Modulation"

SUMMARY

Technical Problem

However, among antenna ports of different groups, resource elements to which a reference signal is mapped are different from one another, and reference signals are not physically multiplexed. Thus a null cannot be directed to a layer of antenna port of different group.

Therefore, this disclosure has been conceived in light of these circumstances, and it is an object of this disclosure to provide a receiving apparatus capable of directing a null to a layer even if reference signals are not physically multiplexed therein and a receiving method thereof.

Solution to Problem

In order to solve the above-mentioned problem, the disclosed receiving apparatus is a receiving apparatus for a wireless communication system capable of performing MIMO communication, and the apparatus includes an adaptive array antenna that includes a plurality of antennas and receives a spatially multiplexed signal of spatially multiplexed multiple layers; a reference signal synthesizer that calculates a synthesized reference signal by multiplying a reference signal portion of each layer of the spatially multiplexed signal by an orthogonal signal corresponding to each layer to synthesize proximity reference signal portions of different resource elements and multiplies, with respect to each layer, a known reference signal by the orthogonal signal as well; a weight calculator that calculates, with respect to each layer, an adaptive array weight from the synthesized reference signal and the known reference signal multiplied by the orthogonal signal; a weight synthesizer that calculates a synthesized reception signal by multiplying, with respect to each layer, the reference signal portion by the adaptive array weight to perform an antenna synthesis; a channel estimator that estimates, with respect to each layer, a propagation path based on the synthesized reception signal and the known reference signal multiplied by the orthogonal signal; and a channel equalizer that implements, with respect to each layer, a channel equalization from the synthesized reception signal and the propagation path.

Furthermore, in the disclosed receiving apparatus, it is preferred that the orthogonal signal has a value that varies depending on the antenna port group.

Moreover, in the disclosed receiving apparatus, it is preferred that the channel estimator estimates the propagation path using a linear interpolation.

In addition, in the disclosed receiving apparatus, it is preferred that the reference signal synthesizer calculates the synthesized reference signal when the correlation of reference signals between resource elements different from each other is high.

Furthermore, in order to solve the above-mentioned problem, the disclosed receiving method is a receiving method for a wireless communication system capable of performing MIMO communication, and the method includes the steps of, receiving a spatially multiplexed signal of spatially multiplexed multiple layers; calculating a synthesized reference signal by multiplying a reference signal portion of each layer of the spatially multiplexed signal by an orthogonal signal corresponding to each layer to synthesize proximity reference signal portions of different resource elements; multiplying, with respect to each layer, a known reference signal by the orthogonal signal; calculating, with respect to each layer, an adaptive array weight from the synthesized reference signal and the known reference signal multiplied by the orthogonal signal; calculating a synthesized reception signal by multiplying, with respect to each layer, the reference signal portion by the adaptive array weight to perform an antenna synthesis; estimating, with respect to each layer, a propagation path based on the synthesized reception signal and the known reference signal multiplied by the orthogonal signal; and implementing, with respect to each layer, a channel equalization from the synthesized reception signal and the propagation path.

Advantageous Effect

According to this disclosure, a null can be directed to a layer even if reference signals are not physically multiplexed therein.

DETAILED DESCRIPTION

The disclosed embodiment will be described below with reference to the drawings. In the present embodiment, the base station transmits a 8-layer spatially multiplexed signal, and regarding the spatially multiplexed signal, it is supposed, as illustrated in FIGS. 4A and 4B, that the resource elements to which the reference signals are mapped are different in group 1 (antenna ports 7, 8, 11 and 13) and group 2 (antenna ports 9, 10, 12 and 14).

Figure 1:
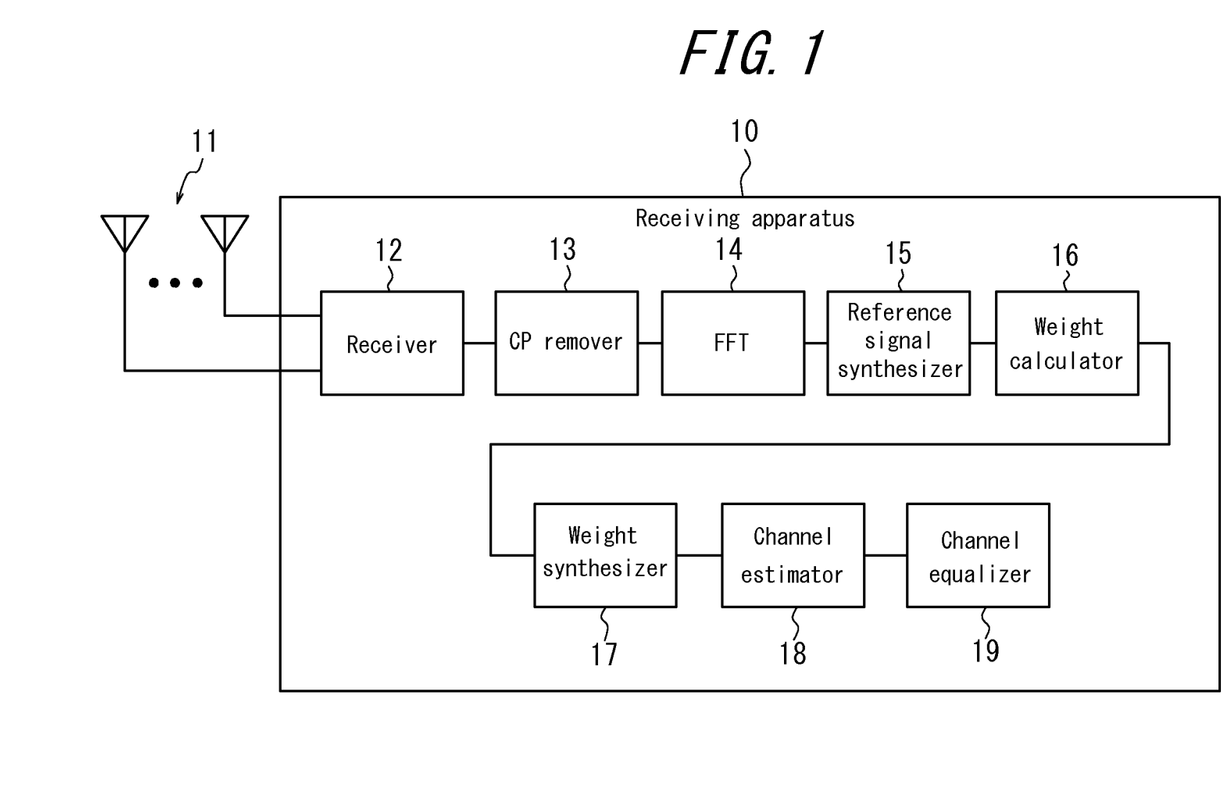
FIG. 1 is a schematic block diagram of a receiving apparatus according to one embodiment of this disclosure.

FIG. 1 is a schematic block diagram of a receiving apparatus according to one embodiment of this disclosure.

A receiving apparatus 10 has an adaptive array antenna 11, a receiver 12, a CP remover 13, a FFT 14, a reference signal synthesizer 15, a weight calculator 16, a weight synthesizer 17, a channel estimator 18 and a channel equalizer 19.

The adaptive array antenna 11 includes a plurality of antennas, such as n pieces of antennas. Each antenna of the adaptive array antenna 11 receives a spatially multiplexed signal of spatially multiplexed multiple layers transmitted by the base station.

The receiver 12 downconverts the spatially multiplexed signal received via the adaptive array antenna 11 and converts the signal to a base band frequency. Then, the receiver 12 converts the downconverted analog signal to a digital signal.

The CP remover 13 removes CP (Cyclic Prefix) from the signal received from the receiver 12.

The FFT 14 implements FFT (Fast Fourier Transform) to the signal received from the CP remover 13 and converts a time domain signal to a frequency domain signal.

Figure 2:
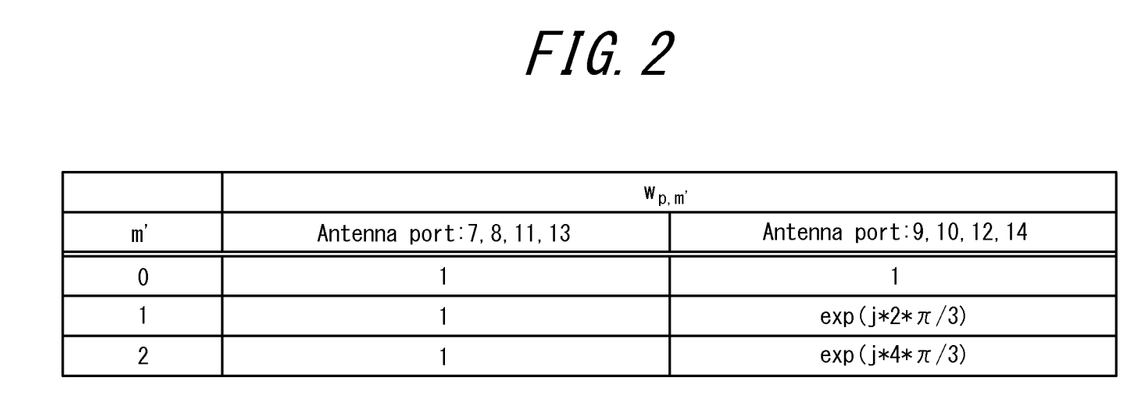
FIG. 2 is an example of an orthogonal signal to be multiplied to a reference signal according to one embodiment of this disclosure.

As illustrated in Equation 1, the reference signal synthesizer 15 calculates a synthesized reference signal by multiplying the reference signal portion of each layer of frequency domain signal received from the FFT 14 (hereinafter referred to as "received reference signal portion") by an orthogonal signal corresponding to each layer, as illustrated in FIG. 2, to synthesize proximity reference signal portions of different resource elements.

$$Z_{k,l}^{(p)} = w_{p,m'} * Y_{k,l}^{(p)} + w_{p,m'} * Y_{k,l}^{(p')} \quad \text{[Equation 1]}$$

In the equation, Z is a synthesized reference signal, w is an orthogonal signal, Y is a received reference signal portion, p is a layer, p' is a layer proximate to p, m' is a number assigned to a subcarrier to which a reference signal is mapped, k is a subcarrier number and l is an OFDM (Orthogonal Frequency Division Multiplexing) symbol number.

As illustrated in FIG. 2, the orthogonal signal w has values that are different in group 1 (antenna ports 7, 8, 11 and 13) and group 2 (antenna ports 9, 10, 12 and 14). In addition, as illustrated in FIG. 2, in group 2, the orthogonal signal w has a value that varies depending on the value of m' (see FIGS. 4A and 4B for the subcarrier corresponding to m'=0, 1 and 2).

Among the antenna ports of different groups, the resource elements to which reference signals are mapped are different from each other and the reference signals are not physically multiplexed, thus correlation of reference signals is high. However, as illustrated in Equation 1, the correlation of reference signals can be reduced when the reference signal synthesizer 15 multiplies the received reference signal portions of different resource elements by an orthogonal signal to synthesize them.

In addition, as illustrated in Equation 2, the reference signal synthesizer 15 multiplies, with respect to each layer, a known reference signal (hereinafter referred to as a "known reference signal") by an orthogonal signal w.

$$b_{k,l}^{(p)} = w_{p,m'} * a_{k,l}^{(p)} \quad \text{[Equation 2]}$$

In the equation, b is a known reference signal multiplied by an orthogonal signal and a is a known reference signal.

As illustrated in Equation 3, the weight calculator 16 calculates, with respect to each layer, an adaptive array weight from the synthesized reference signal Z and the known reference signal b multiplied by the orthogonal signal. Equation 3 is an example where the adaptive array weight is calculated by using a SMI (Sample Matrix Inversion) method.

$$W_p = \left(Z^{(p)H} Z^{(p)}\right)^{-1} \sum_{l=1}^{numRSSym} \sum_{k=1}^{numRSSC} \frac{Z_{k,l}^{(p)}}{b_{k,l}^{(p)}} \quad \text{[Equation 3]}$$

In the equation, $W_p$ is an adaptive array weight. In addition, when the adaptive array weight $W_p$ is calculated in units of resource block, numRSSym is the number of reference signal symbols per resource block, and in the example illustrated in FIGS. 4A and 4B, numRSSym=4. In addition, numRSSC is the number of reference signal subcarriers per resource block, and in the example illustrated in FIGS. 4A and 4B, numRSSC=3. $W_p$ is calculated for the number of antennas, n, included in the adaptive array antenna 11.

As illustrated in Equation 4, the weight synthesizer 17 multiplies, with respect to each layer, a received reference signal portion Y received by respective antennas of the adaptive array antenna 11 by an adaptive array weight $W_p$ to perform an antenna synthesis. Hereinafter the synthesized signal $O_p$ is referred to as a "synthesized reception signal."

$$O_p(k,l) = \sum_{n=1}^{UEANT} Y(k,l,n) * W'_p(n) \quad \text{[Equation 4]}$$

In the equation, UEANT is the number of antennas included in the adaptive array antenna 11, and the symbol "*" shows a conjugate complex number.

As illustrated in Equation 5, the channel estimator 18 estimates, with respect to each layer, a propagation path $WH_p$ based on the synthesized reception signal $O_p$ and the known reference signal b multiplied by the orthogonal signal, using a linear interpolation.

$$WH_p(k,l) = \text{linear interpolation}(O_p(k,l)/b_{k,l}^{(p)}) \quad \text{[Equation 5]}$$

As illustrated in Equation 6, the channel equalizer 19 implements, with respect to each layer, a channel equalization from the synthesized reception signal $O_p$ and the propagation path $WH_p$ and calculates a demodulated signal $O_p$.

$$Q_p(k,l) = O_p(k,l)/WH_p(k,l) \quad \text{[Equation 6]}$$

Figure 3:
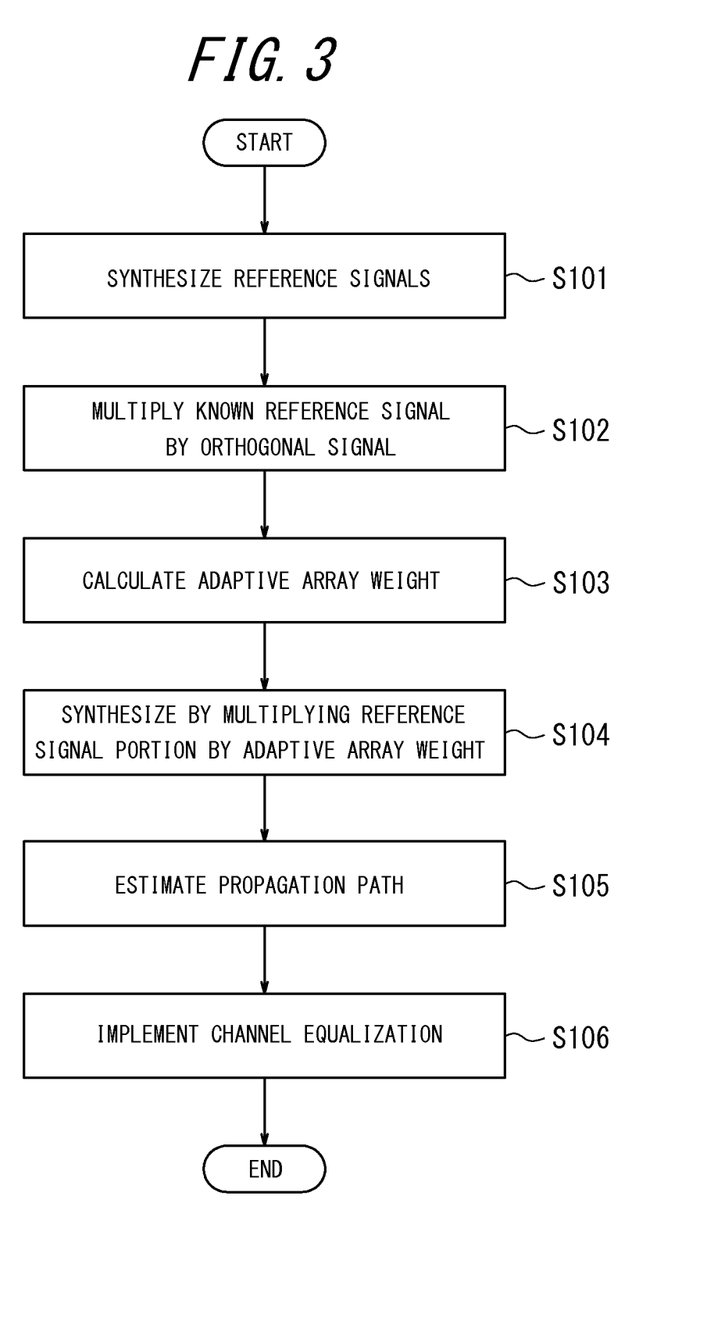
FIG. 3 is a flowchart illustrating an operation of the receiving apparatus according to one embodiment of this disclosure.

Operation of the receiving apparatus 10 according to the disclosed one embodiment will be described with reference to the flowchart illustrated in FIG. 3.

With respect to the reception signal of spatially multiplexed frequency domain after removal of CP by the CP remover 13 and implementation of FFT by the FFT 14, the reference signal synthesizer 15 calculates a synthesized reference signal by multiplying the received reference signal portion of each layer by an orthogonal signal corresponding to each layer to synthesize proximity reference signal portions of different resource elements (step S101). In addition, the reference signal synthesizer 15 also multiplies the known reference signal by the orthogonal signal (step S102). It should be noted that steps 101 and 102 can be performed in reverse order or simultaneously.

The weight calculator 16 calculates, with respect to each layer, an adaptive array weight from the synthesized reference signal and the known reference signal multiplied by the orthogonal signal (step S103).

The weight synthesizer 17 calculates a synthesized reception signal by multiplying, with respect to each layer, the received reference signal portion received by respective antennas of the adaptive array antenna 11 by an adaptive array weight to perform an antenna synthesis (step S104).

The channel estimator 18 estimates, with respect to each layer, a propagation path based on the synthesized reception signal and the known reference signal multiplied by the orthogonal signal, using a linear interpolation (step S105).

The channel equalizer 19 calculates a demodulated signal by implementing, with respect to each layer, a channel equalization from the synthesized reception signal and the propagation path (step S106).

Thus, according to this embodiment, with respect to the spatially multiplexed reception signal, the receiving apparatus 10 multiplies the received reference signal portion of each layer by the orthogonal signal corresponding to each layer to synthesize proximity reference signals of different resource elements, and calculates the synthesized reference signal, then using the synthesized reference signal, calculates the adaptive array weight. Thus a null can also be directed to a layer having a reference element that is not physically multiplexed, without changing the reference signal transmitted by the base station.

Although this disclosure has been described by way of embodiment with reference to the accompanying drawings and embodiment, it is to be noted that various changes and modifications will be apparent to those skilled in the art. Therefore, it should be noted that these changes and modifications are included in the scope of this disclosure.

In addition, although this embodiment was described by taking a case where 8-layer spatially multiplexed signal is received as an example, this is just an example, and our receiving apparatus can also be applied to a spatially multiplexed signal of more than or less than 8-layers.

REFERENCE SIGNS LIST

10 Receiving apparatus
11 Adaptive array antenna
12 Receiver
13 CP remover
14 FFT
15 Reference signal synthesizer
16 Weight calculator
17 Weight synthesizer
18 Channel estimator
19 Channel equalizer

The invention claimed is:

1. A receiving apparatus for a wireless communication system capable of performing MIMO communication, comprising:
   an adaptive array antenna that includes a plurality of antennas and receives a spatially multiplexed signal of spatially multiplexed multiple layers;
   a reference signal synthesizer that:
      synthesizes proximity reference signal portions of resource elements of different antenna port groups by multiplying a reference signal portion of each of the layers of the spatially multiplexed signal by an orthogonal signal corresponding to each of the layers,
      calculates a synthesized reference signal from the synthesized proximity reference signal portions, and
      multiplies, with respect to each of the layers, a known reference signal by the orthogonal signal;
   a weight calculator that calculates, with respect to each of the layers, an adaptive array weight from the synthesized reference signal and the known reference signal multiplied by the orthogonal signal;
   a weight synthesizer that calculates a synthesized reception signal by multiplying, with respect to each of the layers, one of the synthesized proximity reference signal portions by the adaptive array weight to perform an antenna synthesis;
   a channel estimator that estimates, with respect to each of the layers, a propagation path using a linear interpolation based on the synthesized reception signal and the known reference signal multiplied by the orthogonal signal; and
   a channel equalizer that implements, with respect to each of the layers, a channel equalization from the synthesized reception signal and the propagation path.

2. The receiving apparatus according to claim 1, wherein the orthogonal signal has a value that varies depending on a group of antenna port.

3. The receiving apparatus according to claim 1, wherein the reference signal synthesizer calculates the synthesized reference signal when correlation of reference signals mapped to the resource elements of the different antenna port groups is high.

4. A receiving method for a wireless communication system capable of performing MIMO communication, comprising the steps of:

receiving a spatially multiplexed signal of spatially multiplexed multiple layers;
synthesizing proximity reference signal portions of resource elements of different antenna port groups by multiplying a reference signal portion of each of the layers of the spatially multiplexed signal by an orthogonal signal corresponding to each of the layers;
calculating a synthesized reference signal from the synthesized proximity reference signal portions;
multiplying, with respect to each of the layers, a known reference signal by the orthogonal signal;
calculating, with respect to each of the layers, an adaptive array weight from the synthesized reference signal and the known reference signal multiplied by the orthogonal signal;
calculating a synthesized reception signal by multiplying, with respect to each of the layers, one of the synthesized proximity reference signal portions by the adaptive array weight to perform an antenna synthesis;
estimating, with respect to each of the layers, a propagation path using a linear interpolation based on the synthesized reception signal and the known reference signal multiplied by the orthogonal signal; and
implementing, with respect to each of the layers, a channel equalization from the synthesized reception signal and the propagation path.

* * * * *